UNITED STATES PATENT OFFICE.

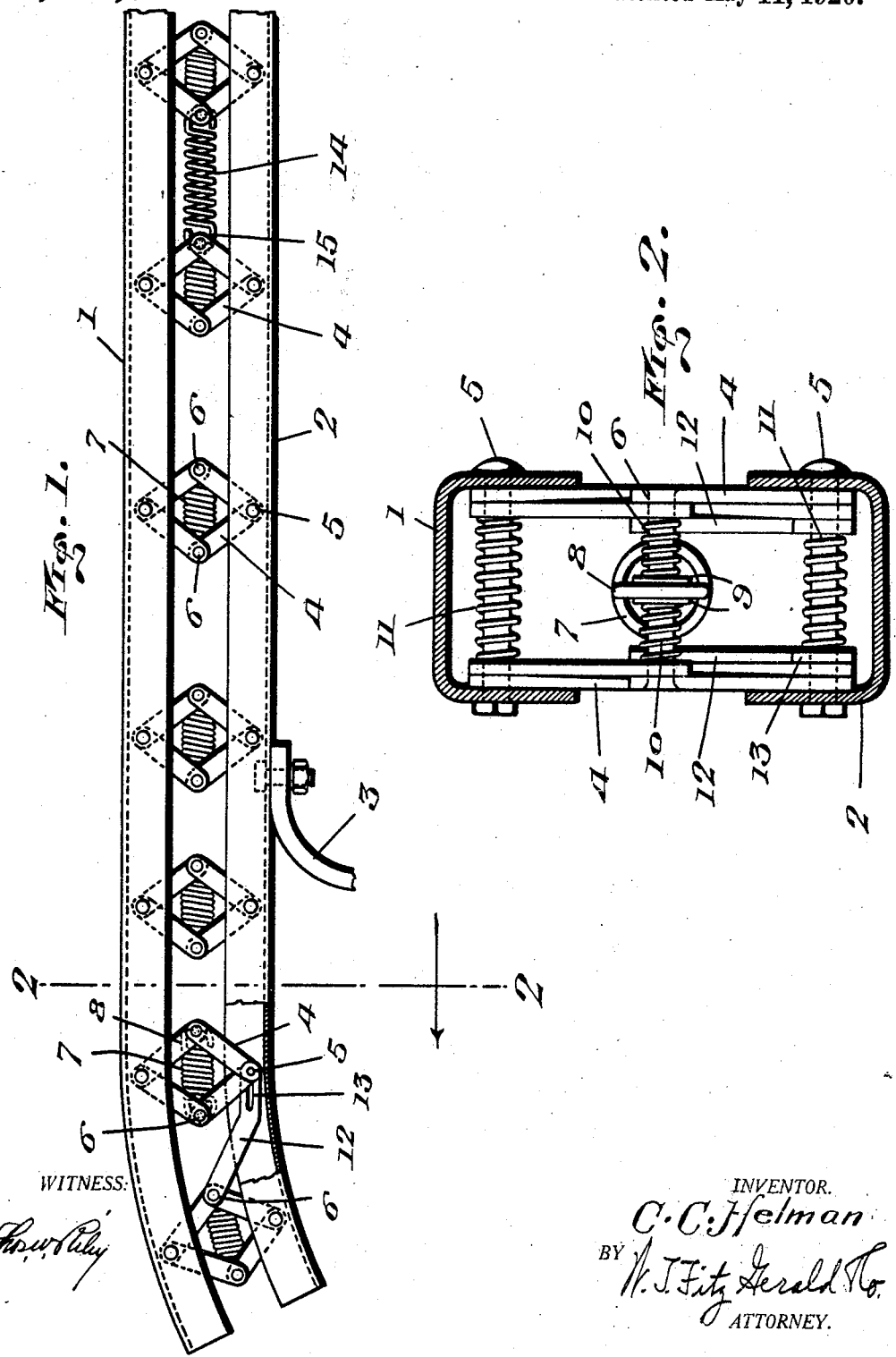

CALVIN C. HELMAN, OF CLEVELAND, OHIO.

AUTOMOBILE-BUMPER.

1,339,756.

Specification of Letters Patent.    Patented May 11, 1920.

Application filed January 9, 1920. Serial No. 350,310.

*To all whom it may concern:*

Be it known that I, CALVIN C. HELMAN, a citizen of the United States, residing at Cleveland, in the county of Cuyahoga and State of Ohio, have invented certain new and useful Improvements in Automobile-Bumpers; and I do hereby declare the following to be a full, clear, and exact description of the invention, such as will enable others skilled in the art to which it appertains to make and use the same.

The present invention relates to bumpers such as used on automobiles for the purpose of avoiding damage and injury in the event of accidental collision, and this invention is particularly an improvement over the bumper disclosed in my Patent No. 1,290,187, granted January 7, 1919.

The present bumper, like that disclosed in said patent, resides generally in the provision of outer and inner parallel bars or members between which are disposed spring-tensioned toggles, providing for a cushioning action of the outer member when colliding with another object, to reduce the possible damage or injury to the automobile as well as the object struck. This invention has for its object the improvement and refinement of such style of bumper, whereby it will have a greater latitude of flexibility and resiliency to afford better protection against damage, and to be more freely yieldable in various directions, as well as being capable of recovering and maintaining its normal position.

A further object is the provision of such a bumper having novel means for limiting the endwise movement of the outer member, and for maintaining it effectively in normal position, yet allowing it to yield freely upon impact and to return to normal position.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawing, wherein:—

Figure 1 is a plan view of the improved bumper, portions being broken away, and only slightly over one half of the bumper being shown.

Fig. 2 is an enlarged cross section taken on the line 2—2 of Fig. 1.

The bumper is composed of the outer and inner parallel channel members 1 and 2, respectively, which are parallel, and the flanges of which extend toward one another to partially house the toggle devices which connect said members. The end portions of the members 1 and 2 are curved, whereby to round off the ends of the bumper to avoid sharp corners, where the bumper is apt to come into contact with an object at one end or the other. The inner member 2 is secured to brackets 3 only one of which is illustrated, which are used for supporting said member 2 from the forward or rear end of the automobile frame.

The toggle devices are arranged in pairs, comprising upper and lower sets of toggle links 4, the opposite ends of which pivotally embrace pivot bolts 5 extending through the flanges of the members 1 and 2, while the adjacent ends of said links are pivotally jointed by means of bolts or rivets 6 extending therethrough. The toggle devices are thus composed of two sets of links which are spaced apart, and coiled retractile springs 7 are located within the toggle devices and have terminal hooks 8 engaging the bolts or pins 6, thereby having a tendency to pull the joints of the toggle devices toward one another, to yieldingly move the outer member 1 away from the inner member 2. The movement of the member 1 toward the member 2, such as by impact with an object, will swing the toggle links to separate the joints thereof, thereby elongating the springs 7 which resist such movement of the parts to afford a cushioning action.

In order to maintain the springs 7 and links 4 in place, and to avoid rattling or loose play, washers 9 are disposed on the pins 6 at the opposite sides of the hooks 8, and coiled wire expansion springs 10 are disposed on said pins and are confined between the washers 9 and links 4. The hooks 8 and springs 7 are thus maintained in intermediate position between the sets of toggle links, and said toggle links are also held together under tension and against the heads of the pins 6, said springs separating said links of the opposite sets. This will avoid the displacement of the springs and links. Similarly, coiled wire expansion springs 11 surround the bolts 5 and are confined between the sets of toggle links for holding them together against the flanges of the members 1 and 2. The springs 10 and 11 thus take up any loose play, and avoid rattling and displacement of the parts, whereby to maintain the operative condition of the bumper without liability of sticking or binding.

A master spring 14 is used at the center of the bumper between the two central toggle devices, having terminal hooks 15 engaging the adjacent pins 6. This retractile spring 14 has a tendency to pull the adjacent toggle devices toward one another, and also tends to maintain them parallel, thereby exerting an influence to hold the member 1 in relative longitudinal position with respect to the member 2.

As a means for positioning the member 1 in normal position, a pair of arms or bars 12 is pivotally engaged to the pin 6 of each end toggle device, and extend obliquely inward and are provided with slotted portions 13 extending at an obtuse angle and slidably engaging the inner bolt 5 of the next toggle device. Said bars or arms 12, like the links 4, are separated by the springs 10 and 11 to maintain the position of said bars, and when the toggle devices elongate by the contraction of the springs 7 to move the member 1 away from the member 2, the bars 12 are slid across the bolts 5 which they engage until the ends of the slotted portions 13 contact with such bolts, thereby limiting the motion. The bars 12 not only limit the separation of the members 1 and 2, but in being located obliquely between the joints of two toggle devices and the inner pivot bolts 5 of companion toggle devices, will restore the member 1 to its proper longitudinal position with respect to the member 2 and maintain it in such position. The bars 12 at one end prevent the member 1 from moving toward such end, while the bars at the opposite end prevent movement of the member 1 toward said end in the opposite direction. Either end of the member 1, however, is free to swing toward the member 2, or the member 1 can move bodily toward said inner member. Thus, by using the bars 12 or equivalent means, they will restore the member 1 to proper normal longitudinal position when the toggle devices are actuated by the springs, and the member 1 is retained in proper longitudinal position for impact, being prevented from accidentally shifting longitudinally out of proper position, either by the vibration of the machine, or a slight endwise pressure against said member 1. However, the member 1 is free to yield at any point of its length, that is, it may yield at either end by contact of one end of the bumper or the other with an object, or the member 1 can move bodily toward the member 2.

Instead of using the bars 12, other members can be used in a similar location for limiting the outward and lengthwise movement of the member 1, or springs similar to springs 14 can be used with their terminal hooks engaging the respective pins 6 and pivot bolts 5.

Having thus described the invention, what is claimed as new is:—

1. A bumper comprising spaced members, spring-tensioned toggle devices connecting them for separating them, and means located obliquely between some of said parts for limiting the separation of said members and for restricting the endwise movement thereof relatively when separated.

2. A bumper comprising spaced members, spring-tensioned toggle devices connecting said members for separating them, and oblique members connecting some of said parts for limiting the separation of said members and the endwise relative movement thereof when separated.

3. A bumper comprising spaced members, spring-tensioned toggle devices connecting same for yieldingly separating them, and oblique bars pivotally connected to some of said parts and slidably engaging others for limiting the separation of said members and the relative endwise movement thereof when separated.

4. A bumper comprising spaced members, toggle devices having joints, pivots connecting said devices with said members, springs connecting the joints of said devices for separating said members, and oblique members connecting some of said joints with some of said pivots for limiting the separation of said members and restricting relative endwise movement thereof when separated.

5. A bumper comprising spaced members, toggle devices having joints, pivots connecting said devices with said members, springs connecting said joints for yieldingly separating said members, and oblique bars between some of said joints and pivots having slotted portions slidably engaging some of them to limit the separation of said members and to restrict the relative endwise movement thereof when separated.

6. A bumper comprising channel members, pivot bolts extending therethrough, toggle devices having links pivotally engaging said bolts, and having pins at their joints, springs having portions engaging said pins for separating said members, and expansion springs on said bolts and pins for separating the links against said channel members and for retaining the aforesaid springs in intermediate position between the links.

In testimony whereof I have signed my name to this specification in the presence of two subscribing witnesses.

CALVIN C. HELMAN.

Witnesses:
 B. Z. ADAMS,
 R. O. JAHN.